(12) United States Patent
Sakashita et al.

(10) Patent No.: US 7,676,644 B2
(45) Date of Patent: Mar. 9, 2010

(54) DATA PROCESSING SYSTEM, STORAGE APPARATUS AND MANAGEMENT CONSOLE

(75) Inventors: Yukinori Sakashita, Sagamihara (JP); Wataru Okada, Odawara (JP); Tsukasa Shibayama, Kawasaki (JP); Yuri Hiraiwa, Sagamihara (JP); Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 1025 days.

(21) Appl. No.: 11/334,443

(22) Filed: Jan. 19, 2006

(65) Prior Publication Data

US 2007/0113041 A1    May 17, 2007

(30) Foreign Application Priority Data

Nov. 14, 2005    (JP)    ............................. 2005-328472

(51) Int. Cl.
G06F 12/00    (2006.01)
G06F 13/00    (2006.01)
G06F 13/28    (2006.01)

(52) U.S. Cl. .................................................. 711/170
(58) Field of Classification Search .................. 711/170
See application file for complete search history.

(56) References Cited

U.S. PATENT DOCUMENTS 5,524,204 A * 6/1996 Verdoorn, Jr. ................... 714/6
2003/0009619 A1 * 1/2003 Kano et al. ................... 711/112
2003/0120655 A1 * 6/2003 Ohwada et al. ................... 707/9
2003/0145167 A1 * 7/2003 Tomita ........................ 711/114
2004/0143832 A1 * 7/2004 Yamamoto et al. ........... 717/174
2005/0160275 A1 * 7/2005 Mitsuoka et al. ............. 713/182
2005/0223174 A1 * 10/2005 Mogi et al. ................... 711/129
2007/0250663 A1 * 10/2007 Welsh et al. ................. 711/117

FOREIGN PATENT DOCUMENTS

JP    2000-112822    4/2000
JP    2003-015915    1/2003

* cited by examiner

Primary Examiner—Sheng-Jen Tsai
(74) Attorney, Agent, or Firm—Antonelli, Terry, Stout & Kraus, LLP.

(57) ABSTRACT

In a data processing system having a storage system and a management computer for managing the storage system, the management computer has an access right setting request unit for transmitting, to the storage system, a request to set a right to access a designated logical volume in response to a predetermined external input. The storage system also has: a control unit for dynamically expanding, as necessary based on an access request from the host computer, the capacity of a first type logical volume by dynamically assigning storage areas in units of segments of predetermined size thereto; and an access right setting unit for setting, in response to a request to set a right to access the first type logical volume from the management computer, a designated access right for each segment assigned to the first type logical volume.

17 Claims, 13 Drawing Sheets

FIG.2

| LUN | TYPE |
|---|---|
| 1 | DYNAMICALLY CAPACITY-EXPANSIBLE LOGICAL VOLUME |
| 2 | DYNAMICALLY CAPACITY-EXPANSIBLE LOGICAL VOLUME |
| 3 | CAPACITY-FIXED LOGICAL VOLUME |
| ... | ... |

| LUN | SEGMENT NUMBER | START ADDRESS | END ADDRESS | ACCESS RIGHT |
|---|---|---|---|---|
| 0 | 1 | 0 | 999 | Read |
|   | 2 | 1000 | 1999 | Read |
| 1 | 3 | 0 | 999 | Read/Write |
| ... | ... | ... | ... | ... |

| POOL NUMBER T300 | PHYSICAL RESOURCE NUMBER T310 | SEGMENT NUMBER T320 | START ADDRESS T330 | END ADDRESS T340 | USAGE STATUS T350 |
|---|---|---|---|---|---|
| 1 | 0 | 0 | 0 | 999 | NOT ASSIGNED |
| | | 1 | 1000 | 1999 | ASSIGNED |
| | | 2 | 2000 | 2999 | ASSIGNED |
| | | 3 | 3000 | 3999 | ASSIGNED |
| | 1 | 4 | 0 | 999 | NOT ASSIGNED |
| | | 5 | 1000 | 1999 | ASSIGNED |
| ... | | ... | ... | ... | ... |

1214

(A)

(B)

| LUN (T200) | SEGMENT NUMBER (T210) | START ADDRESS (T220) | END ADDRESS (T230) | ACCESS RIGHT (T240) |
|---|---|---|---|---|
| 0 | 1 | 0 | 999 | Read |
|  | 2 | 1000 | 1999 | Read |
|  | NULL | 2000 | 4999 | Read/Write |

1211

(C)

| POOL NUMBER (T300) | PHYSICAL RESOURCE NUMBER (T310) | SEGMENT NUMBER (T320) | START ADDRESS (T330) | END ADDRESS (T340) | USAGE STATUS (T350) |
|---|---|---|---|---|---|
| 1 | 0 | 0 | 0 | 999 | NOT ASSIGNED |
|  |  | 1 | 1000 | 1999 | ASSIGNED |
|  |  | 2 | 2000 | 2999 | NOT ASSIGNED |
|  | 1 | 3 | 0 | 999 | ASSIGNED |
|  |  | 4 | 1000 | 1999 | NOT ASSIGNED |
|  |  | 5 | 2000 | 2999 | NOT ASSIGNED |

| LUN | SEGMENT NUMBER | START ADDRESS | END ADDRESS |
|---|---|---|---|
| 0 | 1 | 0 | 999 |
|   | 2 | 1000 | 1999 |
| 1 | 3 | 0 | 999 |
| ... | ... | ... | ... |

DATA PROCESSING SYSTEM, STORAGE APPARATUS AND MANAGEMENT CONSOLE

CROSS REFERENCES TO RELATED APPLICATIONS

This application relates to and claims priority from Japanese Patent Application No. 2005-328472, filed on Nov. 14, 2005, the entire disclosure of which is incorporated herein by reference.

BACKGROUND

The present invention relates to a data processing system, a storage system, and a management computer. It particularly relates to a technique for setting rights for accessing logical volumes created by a dynamic capacity expansion method for a storage system (hereinafter called the "dynamically capacity-expansible logical volumes") and for performing access control therefor.

Lately, the amount of data maintained in a computer system has dramatically increased. In keeping with that situation, storage systems having enormous storage capacities have been employed as storage systems in computer systems.

These types of storage systems provide storage areas in units called logical volumes to host computers. Conventionally, logical volumes of fixed capacities (hereinafter called the "capacity-fixed logical volumes") are set in a storage system based on an administrator's estimation of the required storage capacity.

However, recent storage systems require a logical volume creation method that can enhance the usage efficiency of storage areas. So the inventors of the present invention suggested, in Japanese Patent Laid-Open (Kokai) Publication No. 2003-015915, a method for dynamically expanding the capacity of a virtual logical volume by dynamically assigning partial areas of physical resources to the logical volume in predetermined units (hereinafter called the "segments"). Note that logical devices in a Redundant Array of Independent Disks (RAID) system configured with plural hard disks are defined as "physical resources."

In addition to the need to enhance the usage efficiency of storage areas, a storage system is also required to perform access control, such as—in terms of security—write protection for logical volumes. So the inventors of the present invention also suggested, in Japanese Patent Raid-Open (Kokai) Publication No. 2000-112822, a technique for adding access attributes to management information for logical volumes and for managing access to the logical volume based on the information.

SUMMARY

According to the technique disclosed in Japanese Patent Laid-Open (Kokai) Publication No. 2003-015915, the size of a segment assigned to a logical volume and the size of a physical resource does not always match. If the size of the segment is smaller than that of the physical resource, the same physical resource is shared between plural logical volumes.

In situations like the above, when the access control suggested in Japanese Patent Laid-Open (Kokai) Publication No. 2000-112822 is performed for a certain dynamically capacity-expansible logical volume, it is also set for other dynamically capacity-expansible logical volumes using the same physical resource. Therefore, it is impossible to set a desired access right ("Read Only" or "Read/Write") for a specified dynamically capacity-expansible logical volume alone.

Therefore, if a desired access right can be set for a specified dynamically capacity-expansible logical volume without affecting other dynamically capacity-expansible logical volumes, the access control for the storage areas having the required capacities can be performed without fail while properly assigning the storage areas to the users, thereby realizing a system having high reliability and highly efficient storage capacity usage.

The present invention has been devised considering the above points and aims to suggest a data processing system, a storage system, and a management computer that can achieve high reliability and highly efficient storage capacity usage.

In order to solve the above problems, the present invention provides a data processing system having a storage system for providing logical volumes storing data from a host computer and a management computer for managing the storage system. In the processing system, the management computer has an access right setting request unit for transmitting, to the storage system, a request to set a right to access a designated logical volume in response to a predetermined external input. The storage system has: a control unit for dynamically expanding, as necessary based on an access request from the host computer, the capacity of a first type logical volume by dynamically assigning storage areas in units of segments of predetermined size thereto; and an access right setting unit for setting, in response to a request to set a right to access the first type logical volume from the management computer, a designated access right for each segment assigned to the first type logical volume.

The present invention also provides a storage system for providing logical volumes that store data from a host computer. The storage system includes: a control unit for dynamically expanding, as necessary based on an access request from the host computer, the capacity of a first type logical volume by dynamically assigning storage areas in units of segments of predetermined size to the logical volume; and an access right setting unit for setting, in response to a request to set a right to access the first type logical volume from an external apparatus, a designated access right for each segment assigned to the first type logical volume.

The present invention further provides a management computer for managing a storage system that provides logical volumes storing data from a host computer. The management computer includes: an access right setting request unit for transmitting a request to set a right to access a designated logical volume to the storage system in response to a predetermined external input; and memory for storing management information for the logical volumes, the information indicating the type of each logical volume set in the storage system—a first type having a capacity that can be dynamically expanded, or a second type having a capacity that is fixed. The access right setting request unit decides, in response to the predetermined external input, the type of a designated logical volume based on the management information stored in the memory and transmits to the storage system a request to set an access right befitting the decision result.

With the data processing system, storage system and the management computer according to the present invention, a desired access right can be set for a first type logical volume without influencing other first type logical volumes.

According to the present invention, access controls for storage areas having required capacities can be performed without failure while assigning the storage areas to users, thereby realizing a system with high reliability and highly efficient storage area usage.

BRIEF DESCRIPTION OF THE DRAWINGS

FIG. 2 shows an example of a logical volume management table according to Embodiment 1.

FIG. 3 shows the structure of a volume address list according to Embodiment 1.

FIG. 4 shows the structure of a segment management table according to Embodiment 1.

FIG. 13 shows an example of a volume address list according to Embodiment 2.

DETAILED DESCRIPTION OF THE INVENTION

Embodiments of the present invention are described below in detail with reference to the attached drawings.

(1) EMBODIMENT 1

(1-1) System Configuration According to Embodiment 1

Figure 1:
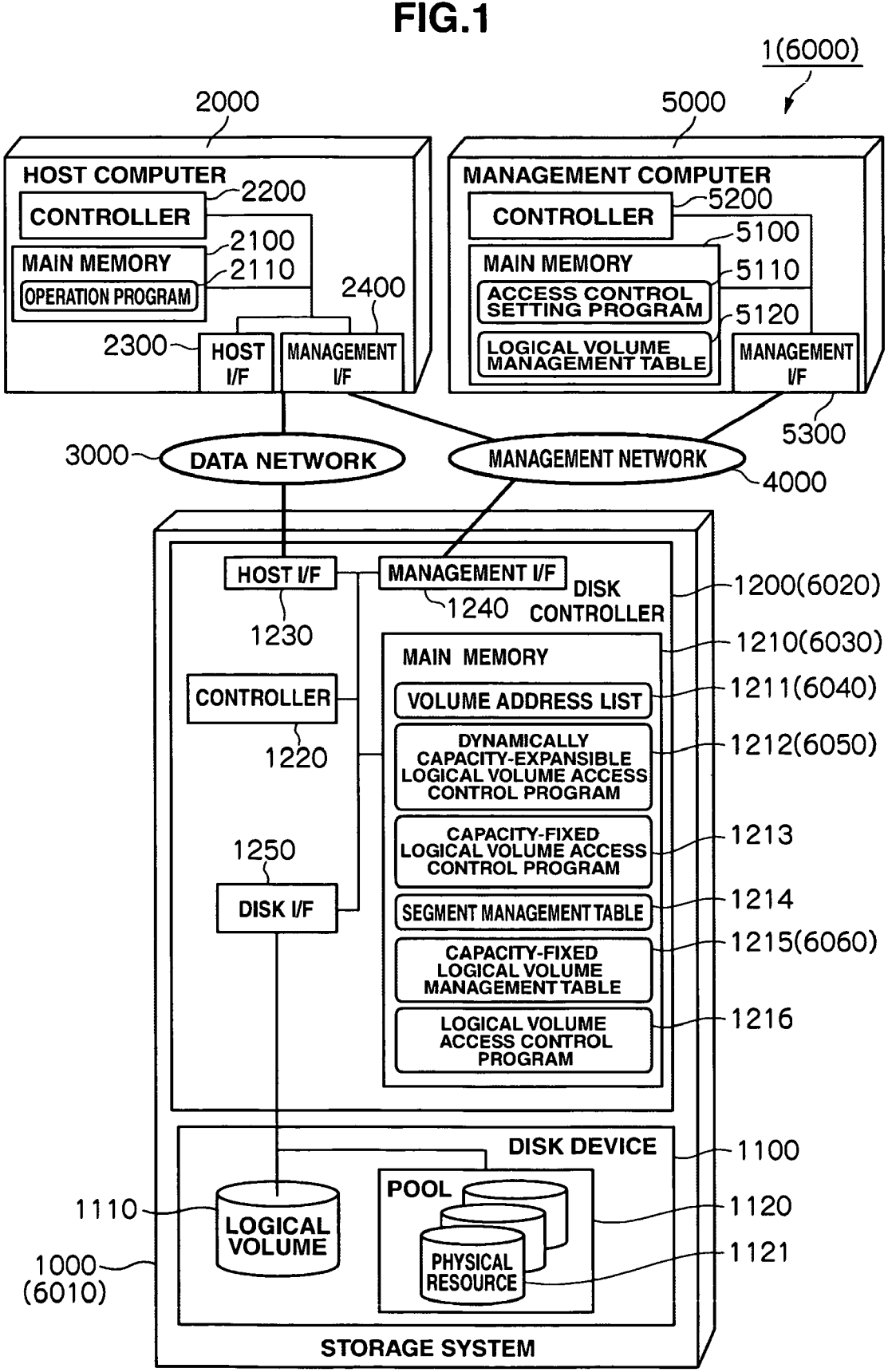
FIG. 1 shows the configuration of a computer system according to Embodiment 1.

FIG. 1 shows the configuration of a computer system 1 according to Embodiment 1. The computer system 1 has a structure where a storage system 1000 and a host computer 2000 are connected to each other via a data network 3000 to enable communication. The data network in Embodiment 1 is a Storage Area Network (SAN) however it may alternatively be an Internet Protocol (IP) network or any other data communication network.

The host computer 2000 and the storage system 1000 are connected to a management computer 5000 via a management network 4000. The management network 4000 in Embodiment 1 is an IP network but it may alternatively be a SAN or any other data communication network. The data network 3000 and the management network 4000 may be the same network and the host computer 2000 and the management computer 5000 may be the same computer. Moreover, for ease of explanation, FIG. 1 shows one storage system 1000, one host computer 2000, and one management computer 5000 however the number of each of the devices is not limited to one in the present invention.

The storage system 1000 is structured with a disk device 1100 for storing data and a disk controller 1200 for controlling the storage system 1000.

The disk device 1100 has one or more logical volumes 1110 and pools 1120. A logical volume 1110 consists of one or more physical resources 1121 and is a logical storage area storing data used by the host computer 2000. Because the storage system 1000 according to Embodiment 1 has a function for dynamically expanding the capacity of a logical volume by, for example, the method disclosed in Japanese Patent Laid-Open (Kokai) Publication No. 2003-015915, both capacity-fixed logical volumes and dynamically capacity-expansible logical volumes exist as logical volumes 1110 in the storage system 1000. Whether a logical volume 1110 is a dynamically capacity-expansible logical volume or a capacity-fixed logical volume is determined when it is created. Note that FIG. 1 shows only one pool 1120 for ease of explanation; in the present invention that number can be any number.

The pool 1120 includes one or more physical resources 1121. A pool 1120 is a logical group for collectively managing the physical resources 1121 using a management method. One example of the management method is RAID type management. Examples of RAID type management include RAID 0, where plural hard disks are provided as one giant storage area to provide a large capacity, and RAID 1, where mirroring is performed between hard disks in order to enhance the redundancy of the hard disks.

The disk controller 1200 includes: main memory 1210; a controller 1220; a host I/F 1230; a management I/F 1240; and a disk I/F 1250.

The main memory 1210 stores: a volume address list 1211; a dynamically capacity-expansible logical volume access control program 1212; a capacity-fixed logical volume access control program 1213; a segment management table 1214; a capacity-fixed volume management table 1215; and a logical volume access control program 1216.

The dynamically capacity-expansible logical volume access control program 1212 is a program that refers to and updates information in the volume address list 1211 and controls access from the host computer 2000 to dynamically capacity-expansible logical volumes. The capacity-fixed logical volume access control program 1213 is a program that refers to or updates information in the capacity-fixed logical volume management table 1215 and controls access from the host computer 2000 to capacity-fixed logical volumes.

The segment management table 1214 is a table for managing information for segments assigned to the dynamically capacity-expansible logical volumes. The logical volume access control program 1216 is a program that calls the dynamically capacity-expansible logical volume access control program 1212 or the capacity-fixed logical volume access control program 1213 when it receives a request to access a logical volume 1110 from the host computer 2000.

The controller 1220 reads and runs the dynamically capacity-expansible logical volume access control program 1212 or the capacity-fixed logical volume access control program 1213 stored in the main memory 1210 when necessary.

The main memory 1210 also stores a program (not shown in the drawing) for having the storage system 100 carry out the function of dynamically expanding the capacities of the logical volumes. Based on that program, and according to access requests from the host computer, the controller 1220 assigns the segments of the physical resources to the logical volumes 1110 that are defined as dynamically capacity-expansible logical volumes.

For ease of explanation, in Embodiment 1, the dynamically capacity-expansible logical volume access control program 1212, the capacity-fixed logical volume access control program 1213, and the logical volume access control program 1216 are structured separately. However, alternatively, the access control for the dynamically capacity-expansible logical volumes and the capacity-fixed logical volumes may be performed by the same program.

The host I/F 1230 is an interface between the disk controller 1200 and the data network 3000 and transmits and receives data and control commands to and from the host computer 2000. The management I/F 1240 is an interface between the disk controller 1200 and the management network 4000 and transmits and receives data and control commands to and from the host computer 2000 and the management computer 5000. The disk I/F 1250 is an interface between the disk controller 1200 and the disk device 1100 and transmits and receives data and control commands to and from the disk device 1100.

The host computer 2000 consists of main memory 2100, a controller 2200, a host I/F 2300, and a management I/F 2400. Note that the host computer 2000 may also have input devices (such as a keyboard and a display device), which are not shown in the drawing.

The main memory 2100 stores an operation program 2110. The operation program 2110 is a program for using the logical volumes 1110 in the storage system 1000 and is, for example, a Database Management System (DBMS) or file system program. For ease of explanation, only one operation program 2110 is shown in the drawing but the number of operation programs is not limited in the present invention. The controller 2200 reads and runs the operation program 2110 stored in the main memory 2100.

The host I/F 2300 is an interface between the host computer 2000 and the data network 3000 and transmits and receives data and control commands to and from the storage system 1000. The management I/F 2400 is an interface between the host computer 2000 and the management network 4000 and transmits and receives data and control commands to and from the storage system 1000 and the management computer 5000.

The management computer 5000 consists of main memory 5100, a controller 5200, and a management I/F 5300. Note that the management computer 5000 may also have input devices (such as a keyboard and a display device), which are not shown in the drawing.

The main memory 5100 stores an access control setting program 5110 and a logical volume management table 5120. The access control setting program 5110 is a program that refers to the information in the logical volume management table 5120 to decide the type of a logical volume, and then transmits an access right setting request to the dynamically capacity-expansible volume access control program 1212 or the capacity-fixed logical volume access control program 1213 in the storage system 1000.

The controller 5200 reads and runs the access control setting program 5110 stored in the main memory 5100. The management I/F 5300 is an interface between the management computer 5000 and the management network 4000 and transmits and receives data and control commands to and from the storage system 1000 and the host computer 2000.

FIG. 2 shows the logical volume management table 5120 according to Embodiment 1. The logical volume management table 5120 includes a Logical Unit Number (LUN) field T100 and a type filed T110, both having information for managing the logical volumes 1110 in the storage system 1000, the logical volumes 1110 being management targets.

The LUN field T100 stores numbers for identifying the logical volumes 1110. The type field T110 stores information about the type of the respective logical volumes 1110—a dynamically capacity-expansible logical volume whose capacity can be expanded or a capacity-fixed logical volume whose capacity cannot be expanded.

FIG. 3 shows the volume address list 1211 according to Embodiment 1. The volume address list 1211 has an LUN field T200, a segment number field T210, a start address field T220, an end address field T230, and an access right field T240, each having information for the configuration of the dynamically capacity-expansible logical volumes.

The LUN field T200 stores numbers for identifying the logical volumes 1110. The segment number field T210 stores numbers for identifying segments assigned to the dynamically capacity-expansible logical volumes. The start address field T220 and the end address field T230 store addresses of the logical volumes provided to the host computer 2000. Note that commonly used Logical Block Addressing (LBA) are used as the addresses of the logical volumes. The access right field T240 stores information for access rights for the logical volumes. Examples of the access rights include: "Read"—permitting only reading of data; and "Read/Write"—permitting both reading and writing of data. For ease of explanation, FIG. 3 shows the access rights in the form of letter strings; however, alternatively, the access rights may be stored in the form of numbers or similar that can identify the types of access rights.

FIG. 4 shows the segment management table 1214 according to Embodiment 1. The segment management table 1214 has: a pool number field T300; a physical resource number field T310; a segment number field T320; a start address field T330; an end address field T340; and a usage status field T350, each having segment management information.

The pool number field T300 stores information for identifying pools that are logical groups for collectively managing the physical resources 1121. The physical resource number field T310 stores information for identifying the physical resources 1121. The segment number field T320 stores information for identifying the segments, which are logically divided units of an arbitrary size, of the physical resources 1121.

The start address field T330 and the end address field T340 store the addresses of the segments in the physical resources 1121. LBA is generally used for the address of a physical resource. The usage status field T350 stores information indicating whether or not a segment is assigned to a logical volume 1110. The usage status field T350 stores either "assigned"—indicating that the segment has been assigned to the logical volume 1110, or "not assigned"—indicating the segment has not yet been assigned to the logical volume 1110. For ease of explanation, FIG. 4 shows the usage statuses in the form of letter strings but the usage statuses may alternatively be stored in the form of numbers or similar as long as they can distinguish the types of usage status.

Figure 5:
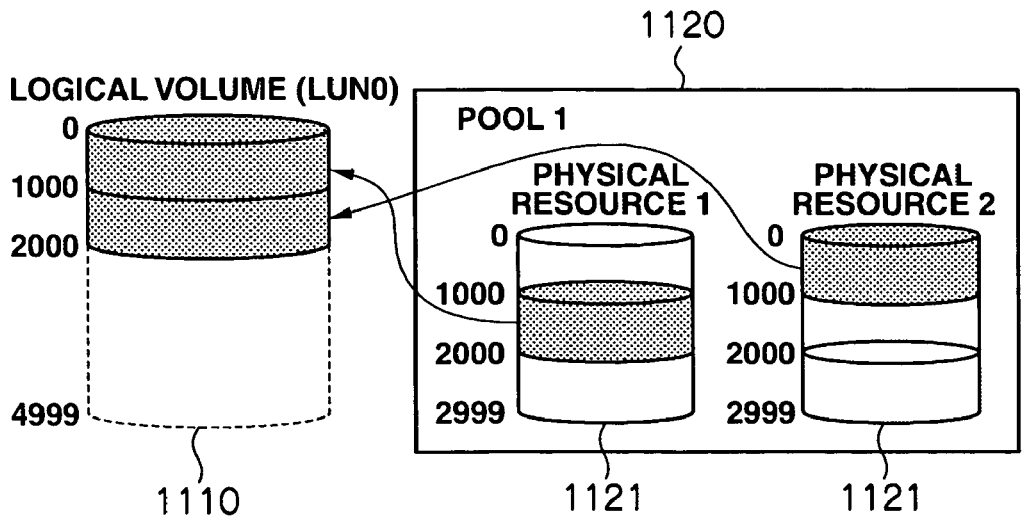
FIG. 5(A)-(C) are schematic diagrams showing an example of the structure of a dynamically capacity-expansible logical volume according to Embodiment 1.

FIG. 5 shows the specific structure of a logical volume 1110 and specific examples of the volume address list 1211 described above in relation to FIG. 3 and the segment management table 1214 described above in relation to FIG. 4.

As shown in FIG. 5 (A), a logical volume 1110 is configured with one or more physical resources 1121. In the example of FIG. 5 (A), the logical volume 1110, which is defined as a dynamically capacity-expansible logical volume, has a structure having a segment of a first physical resource (physical resource 1) 1121 and a segment of a second physical resource (physical resource 2) 1121 assigned thereto, the first and the second physical resources belonging to a first pool area (pool 1) 1120.

In the present example, "0", which is the LUN for the logical volume 1110 is entered in the LUN field T200 as the number for the host computer 2000 to identify the logical volume 1110 with. "1" and "2", which are identification numbers for the segments assigned to the logical volume 1110, are entered in different boxes in the segment number field T210, and "NULL" is entered in another box in the field T210 for the area in the logical volume 1110 where segment(s) are not yet assigned. For ease of explanation, FIG. 5 (B) shows an example where "NULL" is entered in the box for an area having no segment assigned; however, alternatively, a letter string or numbers indicating non-assignment may be stored.

Addresses of all the areas in the logical volume 1110 used by the host computers 2000 are entered in the corresponding boxes in the start address field T220 and the end address field T230 in the volume address list 1211 and access rights for the respective areas in the logical volume 1110 are entered in the corresponding boxes in the access right field T240. In the present example, an access right permitting only data reading is set for the areas where segments are assigned, and an access right permitting both data reading and writing is set for the areas where segments are not yet assigned.

As shown in FIG. 5 (C), "1", which is an identification number for the first pool area 1120 is stored in the pool number field T300 in the segment management table 1214. In the present example, because the first pool area 1120 consists of the first and the second physical resources, their physical resource numbers "1" and "2" are entered in different boxes in the physical resource number field T310.

Moreover, as shown in FIG. 5 (A), in the present example, the first and the second physical resources each consist of three segments, each given a number from "0" to "5", therefore, these numbers are entered in the corresponding boxes in the segment number field T320 in the segment management table 1214

The start addresses and the end addresses of the respective segments are specifically entered in the corresponding boxes in the start address field T330 and the end address field T340. Usage statuses of the segments ("assigned" or "not assigned") are entered in the corresponding boxes in the usage status field T350. In the present example, the segments with the segment numbers "1" and "3" are assigned to the logical volume 1110, therefore, "assigned" is stored in the boxes corresponding to the segments 1 and 3 and "not assigned" is stored in the boxes corresponding to the other segments in the usage status field T350.

Figure 6:
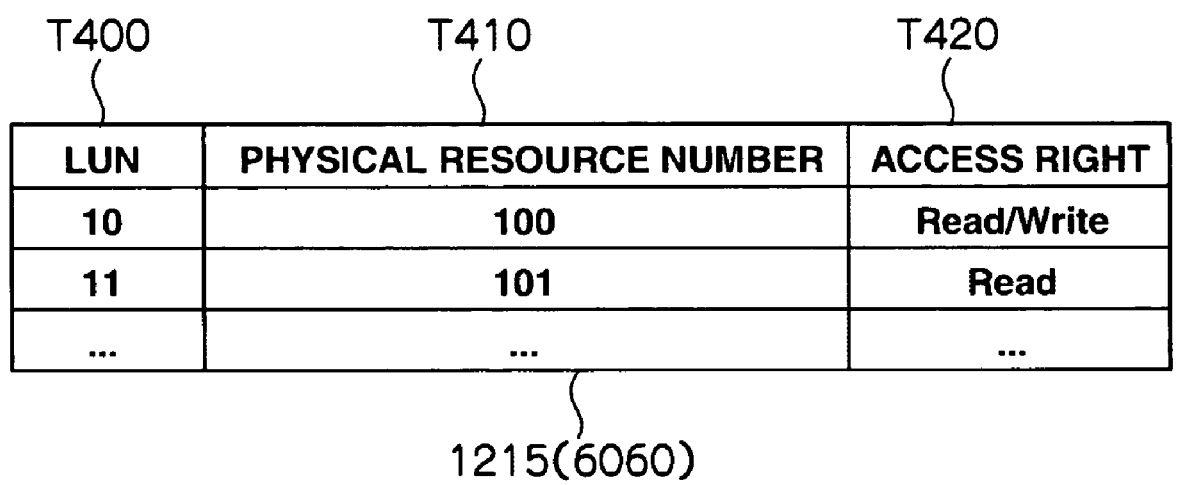
FIG. 6 shows the structure of a capacity-fixed logical volume management table according to Embodiment 1.

FIG. 6 shows the capacity-fixed logical volume management table 1215 according to Embodiment 1. The table has an LUN field T400, a physical resource number field T410, and an access right field T420, each having information for managing the capacity-fixed logical volumes.

Identification numbers of the logical volumes 1110 are entered in different boxes in the LUN field T400. Identification information for the physical resources 1121 assigned to the capacity-fixed logical volumes is stored in the corresponding boxes in the physical resource number field T410. Information for access rights for the logical volumes 1110 is stored in the corresponding boxes in the access right field T420. Examples of the access rights in this case include "Read"—permitting only reading of data from a logical volume 1110 and "Read/Write"—permitting both data reading and writing. For ease of explanation, FIG. 6 shows the access rights in the form of letter strings but they may alternatively be stored in the form of numbers or similar as long as they can distinguish the types of access rights.

(1-2) Operation According to Embodiment 1

Operation of the computer system 1 is explained below. One of the characteristics of the computer system 1 is that an access right is set for the respective segments of the physical resources 1121 dynamically assigned to capacity-expansible logical volumes. Accordingly, even if one physical resource 1211 is shared among plural dynamically capacity-expansible logical volumes, desired access right(s) can be set for a specified dynamically capacity-expansible logical volume without affecting other capacity-expansible logical volumes.

The content of the processing performed by the controller 5200 in the management computer 5000 in the computer system 1 when an administrator inputs an operation command to the management computer 5000 to set an access right for a logical volume 1110 is explained.

Figure 7:
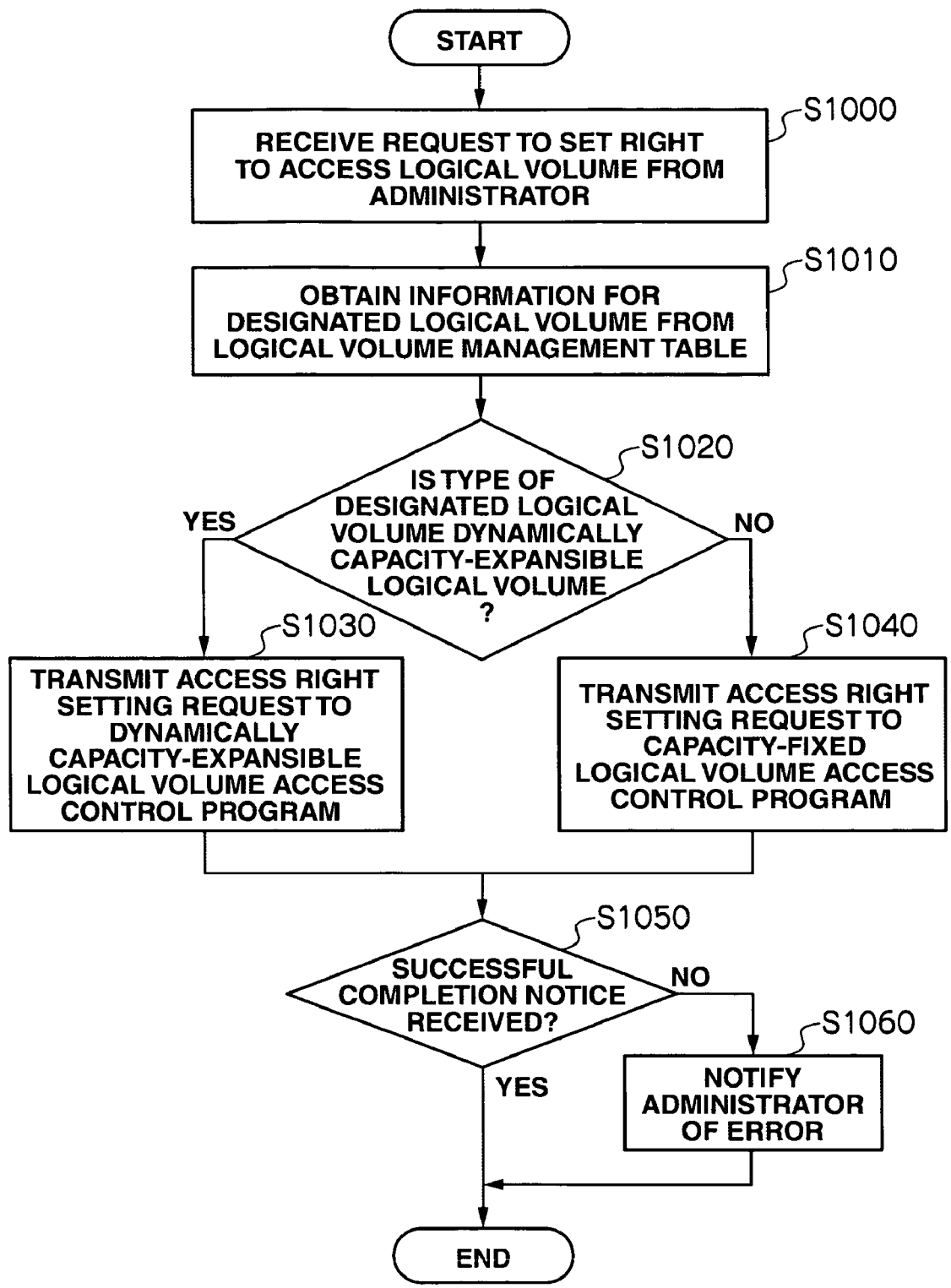
FIG. 7 shows processing executed by an access control setting program 5110 according to Embodiment 1.

Based on the access control setting program 5110 stored in the main memory 5100, the controller 5200 sends an access right setting request to the storage system 10 according to the processing routine shown in the flowchart in FIG. 7.

When the controller 5200 receives the access right setting request including the LUN of the target logical volume and an access right to be set (S1000), it first obtains information about the type of the target logical volume 1110 ("dynamically capacity-expansible logical volume" or "capacity-fixed logical volume") by referring to the logical volume management table 5120 (S1010).

The controller 5200 then judges whether the type of the target logical volume 1110 is "dynamically capacity-expansible logical volume" or not (S1020). If the judgment is positive (S1020: Yes), the controller 5200 transmits, to the dynamically capacity-expansible logical volume access control program 1212 in the storage system 1000, the access right setting request from the administrator which includes the LUN and the access right to be set (S1030). If the judgment is negative (S1020: No), the controller 5200 transmits the same access right setting request to the capacity-fixed logical volume access control program 1213 in the storage system 1000 (S1040).

The controller 5200 then waits for a successful completion notice sent from the dynamically capacity-expansible logical volume access control program 1212 or the capacity-fixed logical volume access control program 1213 indicating that the access right setting processing for the target logical volume 1110 has been successfully completed (S1050), and when it receives that notice (S1050: Yes), it terminates the processing (hereinafter called the "access right setting processing") (S1050).

Meanwhile, if an error notice is sent from the dynamically capacity-expansible logical volume access control program 1212 or the capacity-fixed logical volume access control program 1213 (S1050: No) instead of a successful completion notice, the controller 5200 notifies the administrator of the error and then terminates the access right processing (S1060). Note that the controller 5200 may notify the administrator of the error by email or by outputting the error to the display device in the management computer.

Figure 8:
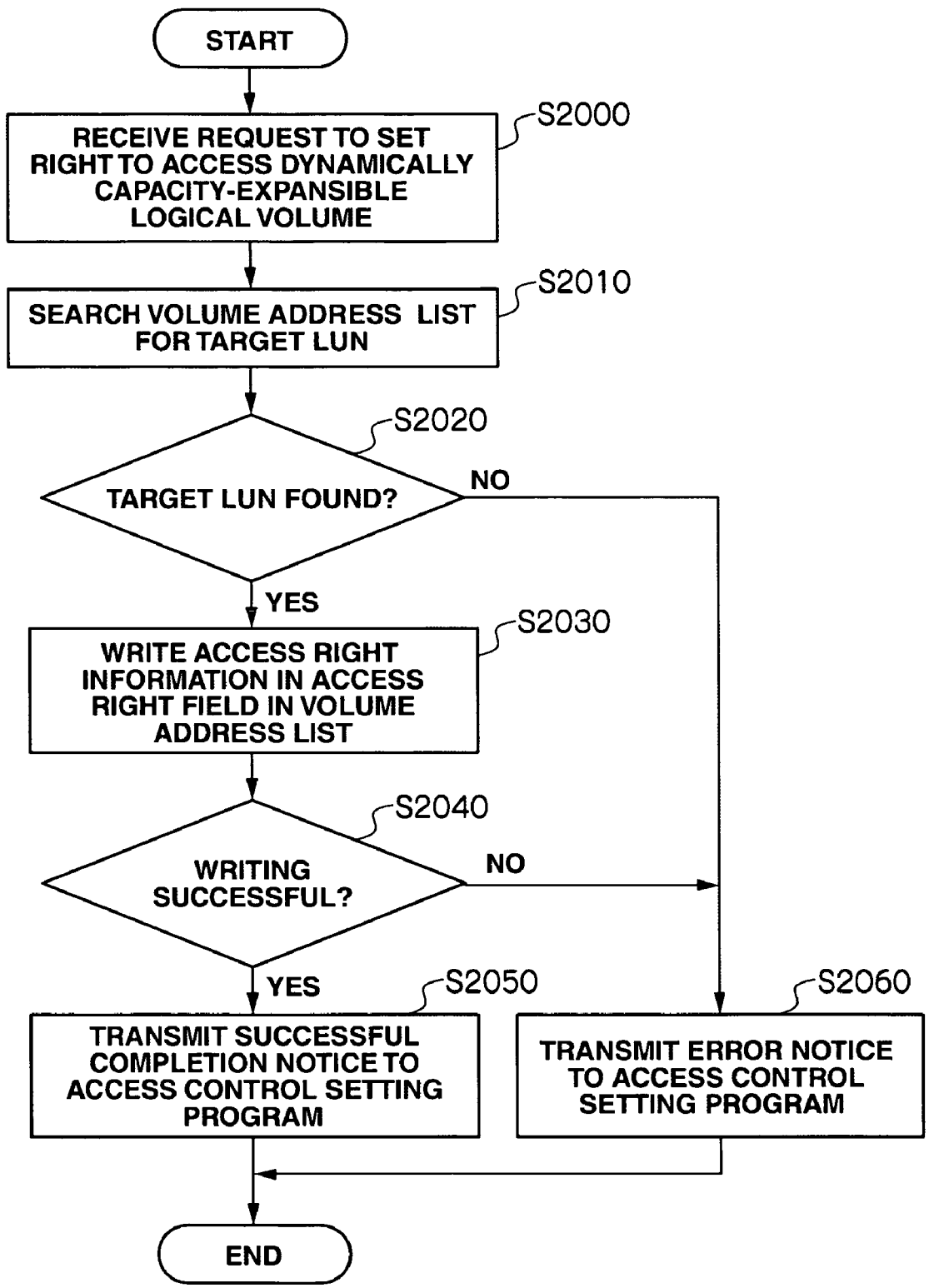
FIG. 8 shows access right setting processing executed by a dynamically capacity-expansible logical volume access control program 1212 according to Embodiment 1.

FIG. 8 is a flowchart indicating the content of the processing performed by the controller 1220 when the storage system 1000 receives an access right setting request for the dynamically capacity-expansible logical volume access control program 1212. In the processing, the controller 1220 sets, based on the dynamically capacity-expansible logical volume access control program 1212 stored in the main memory 1210, a designated access right for the target logical volume 1110 in accordance with the routine shown by the flowchart in FIG. 8.

When the controller 1220 receives an access right setting request for the dynamically capacity-expansible logical volume access control program 1212 from the access control setting program 5100 in the management computer 5000 (S2000), it searches the volume address list 1211 stored in the main memory 1210 for an LUN matching the LUN contained in the access right setting request (S2010).

The controller 1220 then judges whether a matching LUN has been found or not (S2020), and if the judgment is negative (S2020: No), it transmits an error notice to the access control setting program 5110 (S2060), and terminates the processing for the access right setting request.

If a matching LUN has been found (S2020: Yes), the controller 1220 writes the access right contained in the access right setting request in the corresponding box in the access right field T240 in the volume address list 1211 (S2030).

In the access right field T240, the access right may be written in the box(es) for the address(es) only of the area(s) in the logical volume to which segment(s) are assigned or may be written in the boxes for the addresses of all the areas in the logical volume. If the access right is set only for the address(es) of the area(s) in the logical volume where segment(s) are assigned, the access rights of the addresses of areas having no segments assigned remain as the original access rights. Generally, the default access right is "Read/Write"—allowing reading and writing of data. Note that writing of an access right in the access right field T240 in the volume address list 1211 is overwriting, therefore, an access right that has been set for an address of an area is updated with a new access right after the access right writing.

The controller 1220 then judges whether writing of the access right in the access right field T240 was successful (S2040). If the judgment is positive (S2040: Yes), the controller 1220 transmits a successful completion notice to the access control setting program 5110 in the management computer 5000 (S2050) and terminates the processing for the access right setting request. If the controller 1220 judges that writing of the access right in the access right field T240 failed (S2040: No), it transmits an error notice to the access control setting program 5110 and terminates the processing for the access right setting request.

Figure 9:
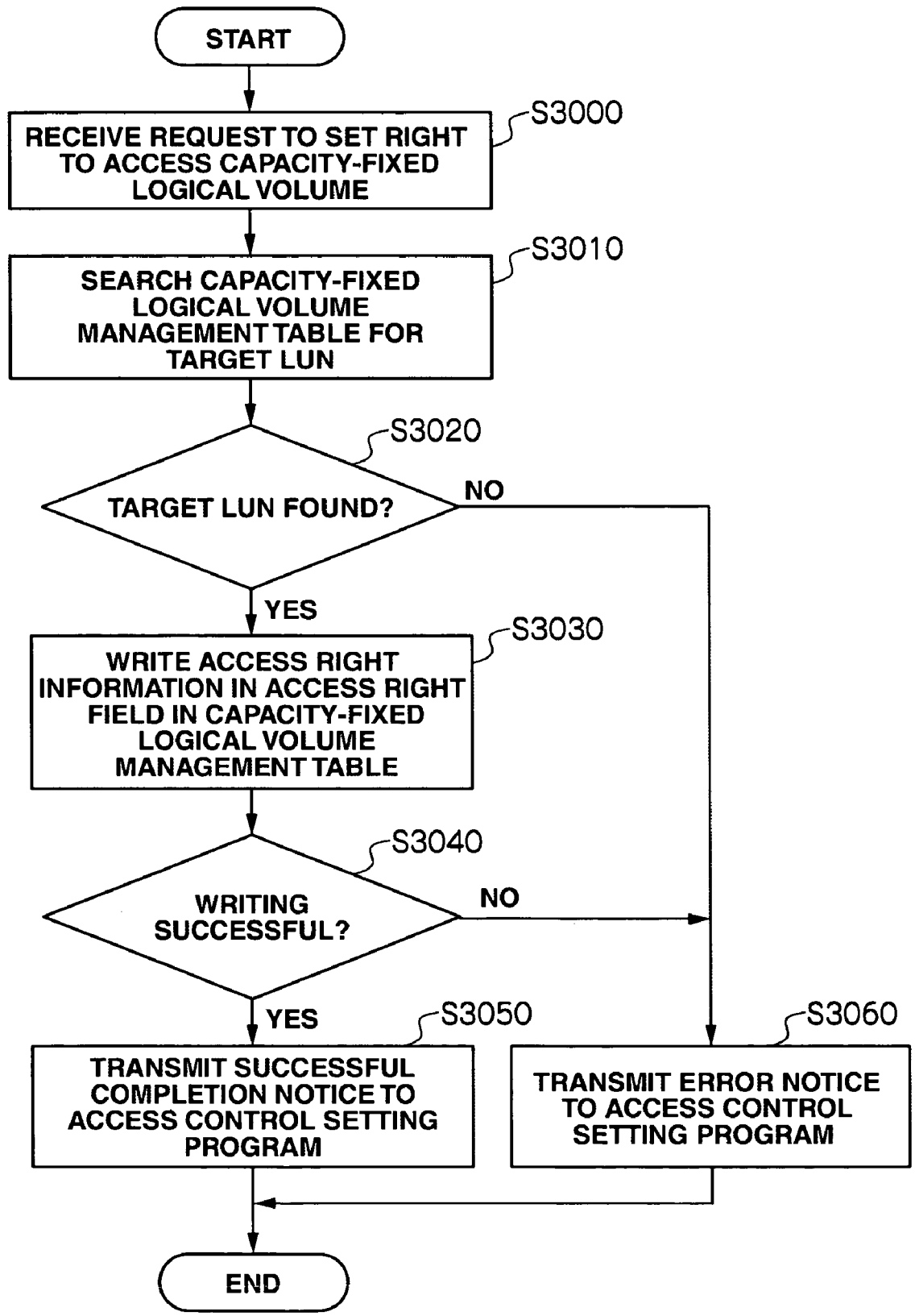
FIG. 9 shows access right setting processing executed by a capacity-fixed logical volume access control program 1213 according to Embodiment 1.

FIG. 9 shows a flowchart indicating the content of processing performed by the controller 1220 when the storage system 1000 receives an access right setting request for the capacity-fixed logical volume access control program 1213. In this processing, the controller 1220 sets a designated access right for a designated logical volume 1110 in accordance with the processing routine shown in the flowchart in FIG. 9 based on the capacity-fixed logical volume access control program 1213 stored in the main memory 1210.

When the controller 1220 receives the access right setting request for the capacity-fixed logical volume access control program 1213 from the access control setting program 5100 in the management computer 5000 (S3000), it first searches the capacity-fixed logical volume management table 1215 stored in the main memory 1210 for an LUN matching the LUN contained in the access right setting request (S3010).

The controller 1220 then judges whether a matching LUN has been found or not (S3020) and if the judgment is negative (S3020: No), it transmits an error notice to the access control setting program 5110 and terminates the processing for the access right setting request.

Meanwhile, if a matching LUN was found in the search (S3020: Yes), the controller 1220 writes the access right contained in the access right setting request in the corresponding box in the access right field T420 in the capacity-fixed logical volume management table 1215 (S3030). If an access right has already been written in the access right field T420 (that is, an access right has already been set for the LUN), it is overwritten with the access right contained in the access right setting request. In other words, the access right set for the LUN is updated with the access right contained in the access right setting request.

Subsequently, the controller 1220 judges whether the writing of the designated access right in the access right field T420 was successful (S3040). If the judgment is positive (S3040: Yes), the controller 1220 transmits a successful completion notice to the access control setting program 5110 in the management computer 5000 (S3060) and terminates the processing for the access right setting request. If the controller 1220 judges that writing of the access right in the access right field T420 failed (S3040: No), it transmits an error notice to the access control setting program 5110 and terminates the processing for the access right setting request.

The content of processing performed by the controller 1220 when a request to access a logical volume 1110 is transmitted from the host computer 2000 to the storage system 1000 is explained below.

Figure 10:
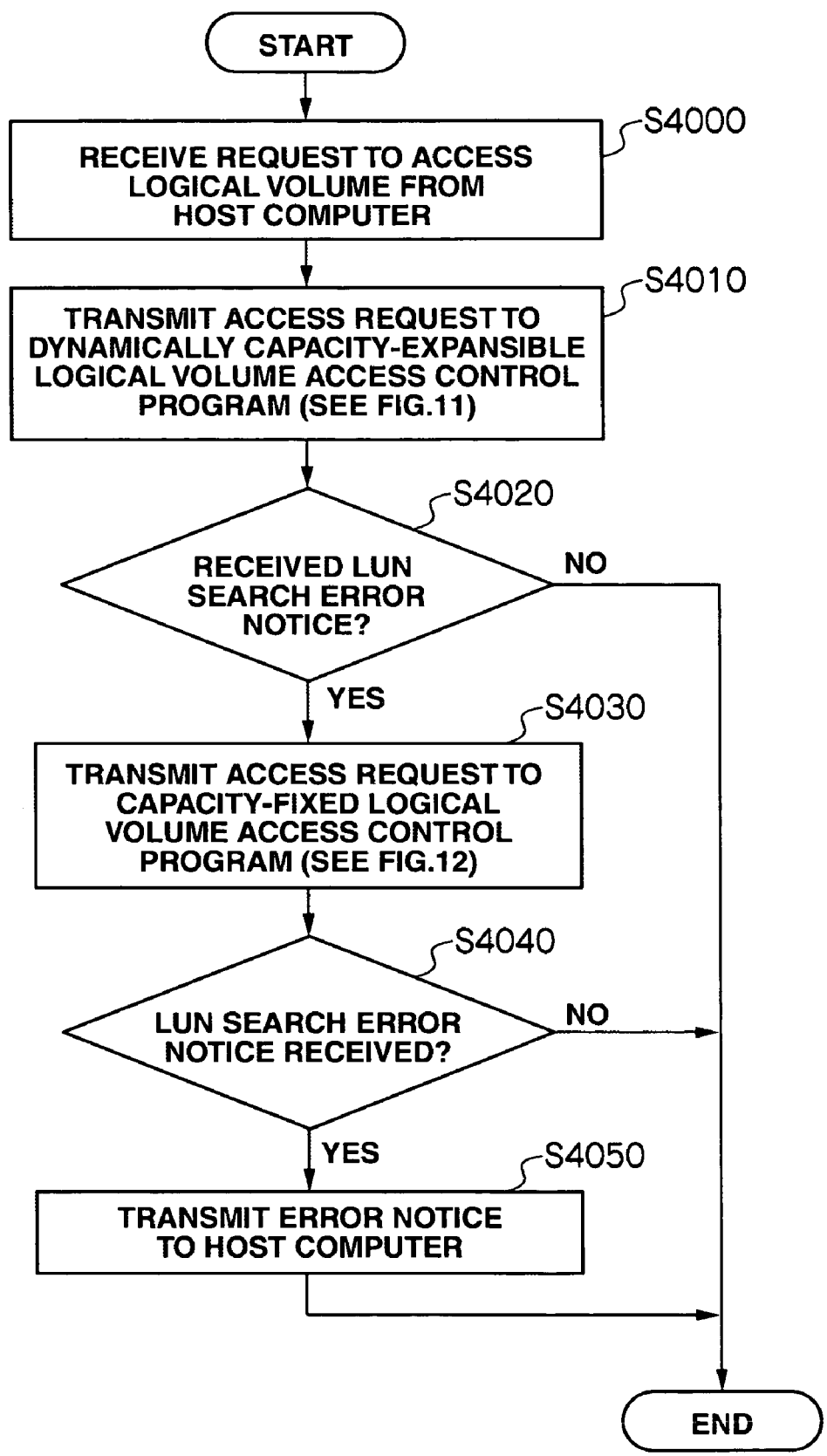
FIG. 10 shows processing executed by a logical volume access control program 1216 according to Embodiment 1.

In the processing, the controller 1220 controls access to a designated logical volume in accordance with the processing routine shown in the flowchart in FIG. 10 based on the logical volume access control program 1216 stored in the main memory 1210.

When the controller 1220 receives from the host computer 2000 the access request containing the LUN of the target logical volume, an access target address, and a command type for determining whether the command is a read command or a write command (S4000), it first transmits the access request to the dynamically capacity-expansible logical volume access control program 1212 (S4010).

The controller 1220 executes access control processing, which will be described later in relation to FIG. 11, based on the dynamically capacity-expansible logical volume access control program 1212, and if the host computer 2000 does not have the designated access right to access the target logical volume 1110, it transmits a search error notice to the logical volume access control program 1216, but if the host computer 2000 has that right, the controller 1220 accepts the access request.

In order to do so, after the controller 1220 transmits the access request to the dynamically capacity-expansible logical volume access control program 1212 (S4010), it judges whether it has received a search error notice from the dynamically capacity-expansible logical volume access control program 1212 (S4020).

Negative judgment (S4020: No) means that the target logical volume 1110 is set as a dynamically capacity-expansible logical volume and that the host computer 2000 has the designated access right for it. Therefore, the controller 1220 terminates the processing for the access request (hereinafter called the "access request receiving processing").

On the other hand, positive judgment (S4020: Yes) means that the target logical volume 1110 is not set as a dynamically capacity-expansible logical volume or that the host computer 2000 does not have the designated access right for the logical volume 1110. In this case, the controller 1220 transmits the access request to the capacity-fixed logical volume access control program 1213 (S4030).

In the above case, the controller 1220 then executes access control processing, which will be described later in relation to FIG. 12, based on the capacity-fixed logical volume access control program 1213, and if the host computer 2000 does not have the designated access right for the logical volume 1110, it transmits a search error notice to the logical volume access control program 1216, but if the host computer 2000 has that right, the controller accepts the access request.

In order to do so, after the controller 1220 transmits the access request to the capacity-fixed logical volume access control program 1213 (S4030), it judges whether it has received a search error notice from the capacity-fixed logical volume access control program (S4040).

Negative judgment (S4040: No) means that the target logical volume 1110 is set as a capacity-fixed logical volume and the host computer 2000 has the designated access right for it. Therefore, the controller 1220 terminates the access request receiving processing.

Whereas, positive judgment (S4040: Yes) means that the target logical volume 1110 is not set as a capacity-fixed logical volume either or that the host computer 2000 does not have the designated access right for it. In this case, the controller 1220 transmits an error notice indicating that it could not find the target logical volume 1110 to the host computer 2000 (S4050) and terminates the access request receiving processing.

Embodiment 1 is explained regarding the case where the access control is performed in such a manner that the controller 1220 first transmits an access request to the dynamically capacity-expansible logical volume access control program 1212 and if it receives a search error therefrom, it transmits the access request to the capacity-fixed logical volume access control program 1213. However, alternatively, the access control may be performed in such a manner that the controller 1220 first transmits an access request to the capacity-fixed logical volume access control program 1213 and then if it receives a search error notice therefrom, it transmits the access request to the dynamically capacity-expansible logical volume access control program 1212. Moreover, the storage system 1000 may also have in its main memory 1210 a table having the same information as that in the logical volume management table 5120 in the management computer 5000 so that when the controller 1220 receives a request to access a target logical volume 1110 from the host computer 2000, it searches the logical volume management table in itself and calls either the capacity-expansible logical volume access control program 1212 or the capacity-fixed logical volume access control program 1213 in accordance with the type of target logical volume.

Next, the content of processing performed by the controller 1220 after it transmits the access request to the dynamically capacity-expansible logical volume access control program 1212 in Step 4010 in the aforementioned access request receiving processing (FIG. 10) is explained below.

Figure 11:
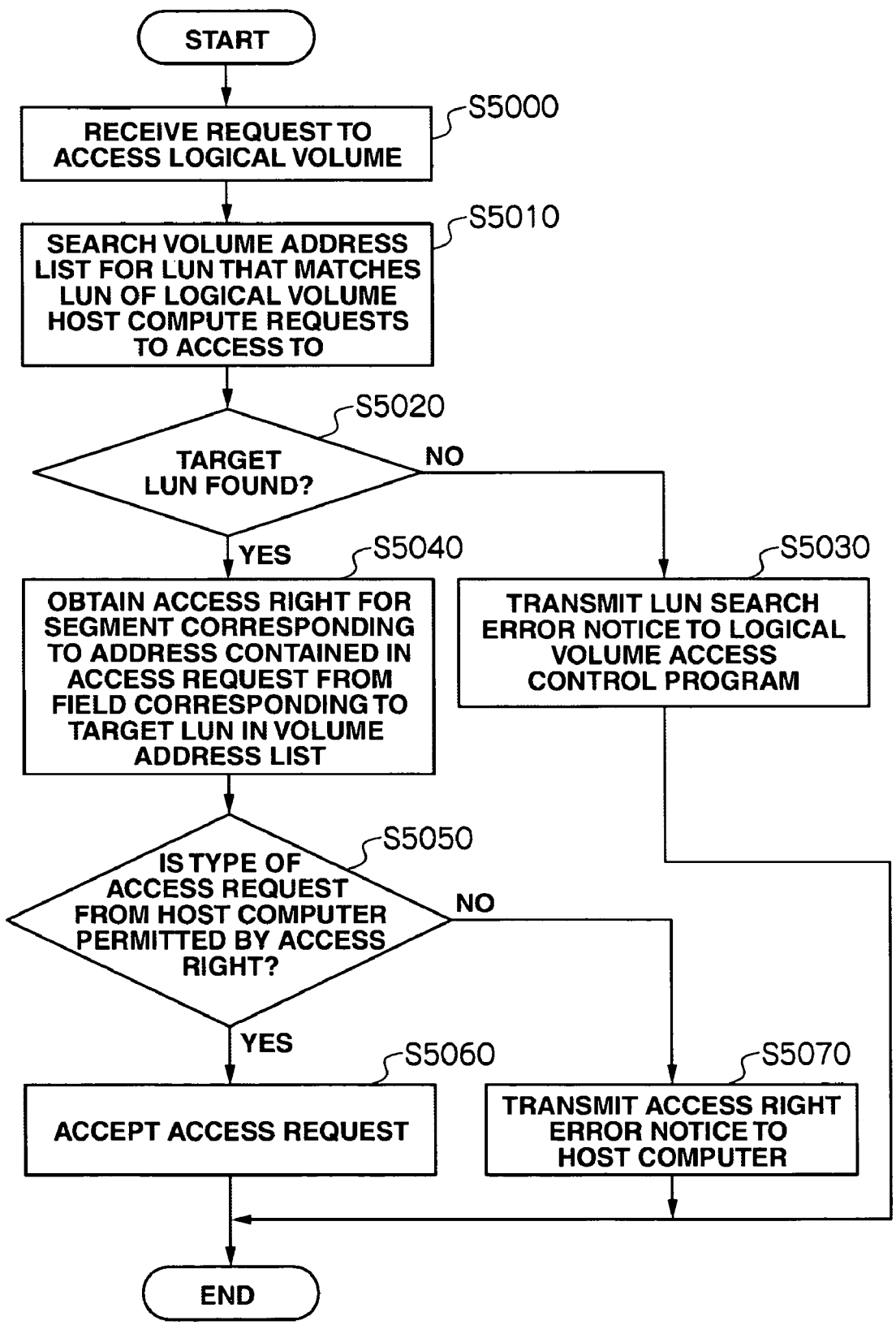
FIG. 11 shows access control processing executed by the dynamically capacity-expansible logical volume access control program 1212 according to Embodiment 1.

In this processing, the controller 1220 decides whether or not to permit access to the target logical volume in accordance with the processing routine in the flowchart shown in FIG. 11, based on the dynamically capacity-expansible logical volume access control program 1212 stored in the main memory 1210.

Specifically, when the controller 1220 receives the access request from the logical volume access control program 1216 (S5000), it searches the volume address list 1211 for an LUN that matches the LUN contained in the access request (S5010).

The controller 1220 then judges whether a matching LUN has been found or not (S5020) and if the judgment is negative (S5020: No), it transmits an LUN search error notice to the logical volume access control program 1216 (S5030), and terminates the processing for the access request (hereinafter called the "first access control processing").

Whereas, if the judgment is positive (S5020: Yes), the controller 1220 obtains, from the box corresponding to the matching LUN in the access right field T240 in the volume address list 1211 (FIG. 3), an access right for segment(s) corresponding to the address(es) contained in the access request (S5040). If there is no segment assigned to the address(s), the controller 1220 returns a default access right to the logical volume access control program 1216. Generally, a default access right is "Read/Write"—allowing reading and writing of data.

Subsequently, the controller 1220 judges whether the type of the command contained in the access request received in Step 5000 is the type permitted by the access right obtained in Step 5040 (S5050).

If the judgment is positive (S5050: Yes), the controller 1220 accepts the access request (S5060) and terminates the first access control processing. Whereas, if the judgment is negative (S5050: No), it transmits an access right error notice to the host computer 2000 (S5070) and terminates the first access control processing.

As described, when an access request is given from the host computer 2000 to a dynamically capacity-expansible logical volume, the storage system 1000 performs access control by executing the access request receiving processing in FIG. 10 and the first access control processing in FIG. 11. In Embodiment 1, the access right setting processing in FIG. 8 and the access control processing in FIG. 11 are performed by the dynamically capacity-expansible logical volume access control program 1212 for ease of explanation; however, they may alternatively be performed by different programs.

Next, the content of processing performed by the controller 1220 after it transmits the access request to the capacity-fixed logical volume access control program 1213 in Step 4030 in the aforementioned access request receiving processing described in relation to FIG. 9 is explained.

Figure 12:
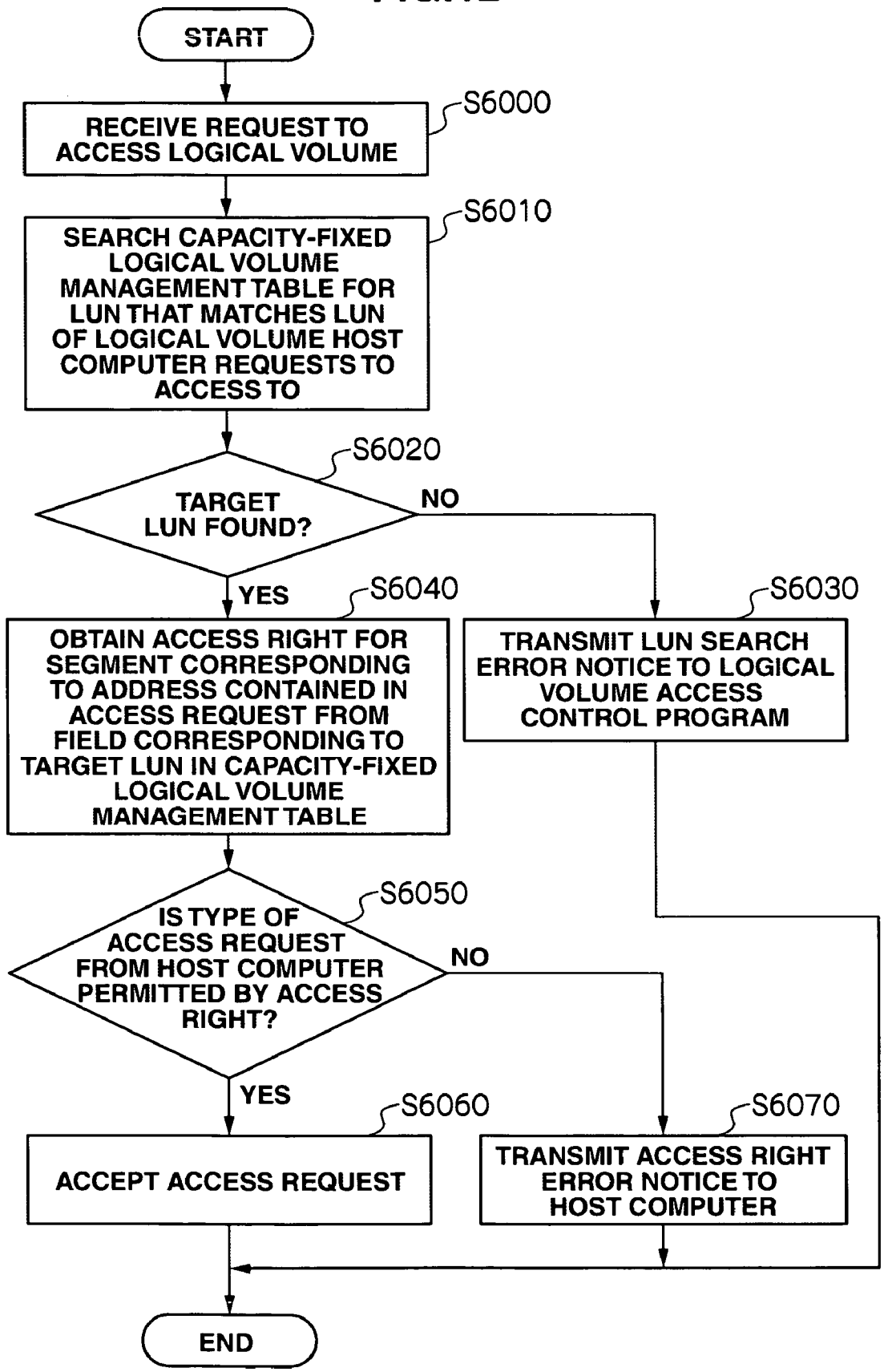
FIG. 12 shows access control processing executed by the capacity-fixed logical volume access control program 1213 according to Embodiment 1.

In this processing, the controller 1220 judges whether or not to permit access to the designated logical volume in accordance with the processing routine in the flowchart shown in FIG. 12, based on the capacity-fixed logical volume access control program 1213 stored in the main memory 1210.

When the controller 1220 receives the access request from the logical volume access control program 1216 (S6000), it searches the capacity-fixed logical volume management table 1215 for an LUN that matches the LUN contained in the access request (S6010).

The controller 1220 then judges whether a matching LUN has been found or not (S6020), and if the judgment is negative (S6020: No), it transmits an LUN search error notice to the logical volume access control program 1216 (S6030) and terminates the processing for the access request (hereinafter called the "second access processing").

Meanwhile, if the judgment in Step 6020 is positive (S6020: Yes), the controller 1220 obtains, from the box corresponding to the matching LUN in the access right field T420 in the capacity-fixed logical volume management table 1215 (FIG. 5), an access right for segment(s) corresponding to the address contained in the access request (6040). If no segment is assigned corresponding to the address, an default access right is returned to the logical volume access control program 1216.

The controller 1220 then judges whether the type of command contained in the access request received in Step 6000 is the type permitted by the access right obtained in Step 6040 (S6050).

If the judgment is positive (S6050: Yes), the controller 1220 accepts the access request (S6060) and terminates the second access control processing. Meanwhile, if the judgment is negative (S6050: No), the controller 1220 transmits an access right error notice to the host computer (S6070) and terminates the second access control processing.

As described, when an access request is given from the host computer 2000 to a capacity-fixed logical volume, the storage system 1000 performs access control by performing the access request receiving processing in FIG. 10 and the second access control processing in FIG. 12. Note that, in Embodiment 1, the access right setting processing in FIG. 9 and the second access control processing in FIG. 12 are performed by the capacity-fixed logical volume access control program 1213; however, they may alternatively be performed by different programs.

As explained, in Embodiment 1, an access right can be set for each of segments in a physical resource 1121 and the access rights for the segments are set in the volume address list 1211, the list being part of the management information for the dynamically capacity-expansible logical volumes. Accordingly, a desired access right can be set for a designated dynamically capacity-expansible logical volume without affecting other dynamically capacity-expansible logical volumes, and access control for a logical volume can be performed according to the type of the access right set for the logical volume.

(2) Embodiment 2

In Embodiment 1, access rights are set in the volume address list 1211, which is part of the management information for dynamically capacity-expansible logical volumes. However, in Embodiment 2, the access rights for the dynamically capacity-expansible logical volumes are set in the capacity-fixed logical volume table 6060 (FIG. 6), where access rights for capacity-fixed logical volumes are also set. Moreover, in Embodiment 2, when setting a right to access a dynamically capacity-expansible logical volume, all the segments constituting the dynamically capacity-expansible logical volume are consolidated in one physical resource, which is then set as a capacity-fixed logical volume. A method for managing the access rights in such a manner is explained below.

(2-1) System Configuration According to Embodiment 2

In FIG. 1, a reference numeral 6000 indicates a computer system according to Embodiment 2. The computer system 6000 is structured in the same manner as the computer system 1 according to Embodiment 1 except for the structures of a volume address list 6040 and a dynamically capacity-expansible logical volume access control program 6050, both stored in main memory 6030 in a disk controller 6020.

As shown in FIG. 13, in which the parts corresponding to those in FIG. 3 are given the same reference numerals as in FIG. 3, the volume address list 6040 in Embodiment 2 has a structure where the access right field T240 is deleted from the volume address list 1211 in Embodiment 1 described in relation to FIG. 3. This is because, in Embodiment 2, as access rights for dynamically capacity-expansible logical volumes are set in the capacity-fixed logical volume management table 1215, the volume address list 6040 does not need the access right field T240.

(2-2) Operation in Embodiment 2

Operations of the computer system 6000 according to Embodiment 2 are explained below. Most of the operations performed by the computer system 6000 are the same as those performed by the computer system 1 according to Embodiment 1, so only those different between the two are explained.

Figure 14:
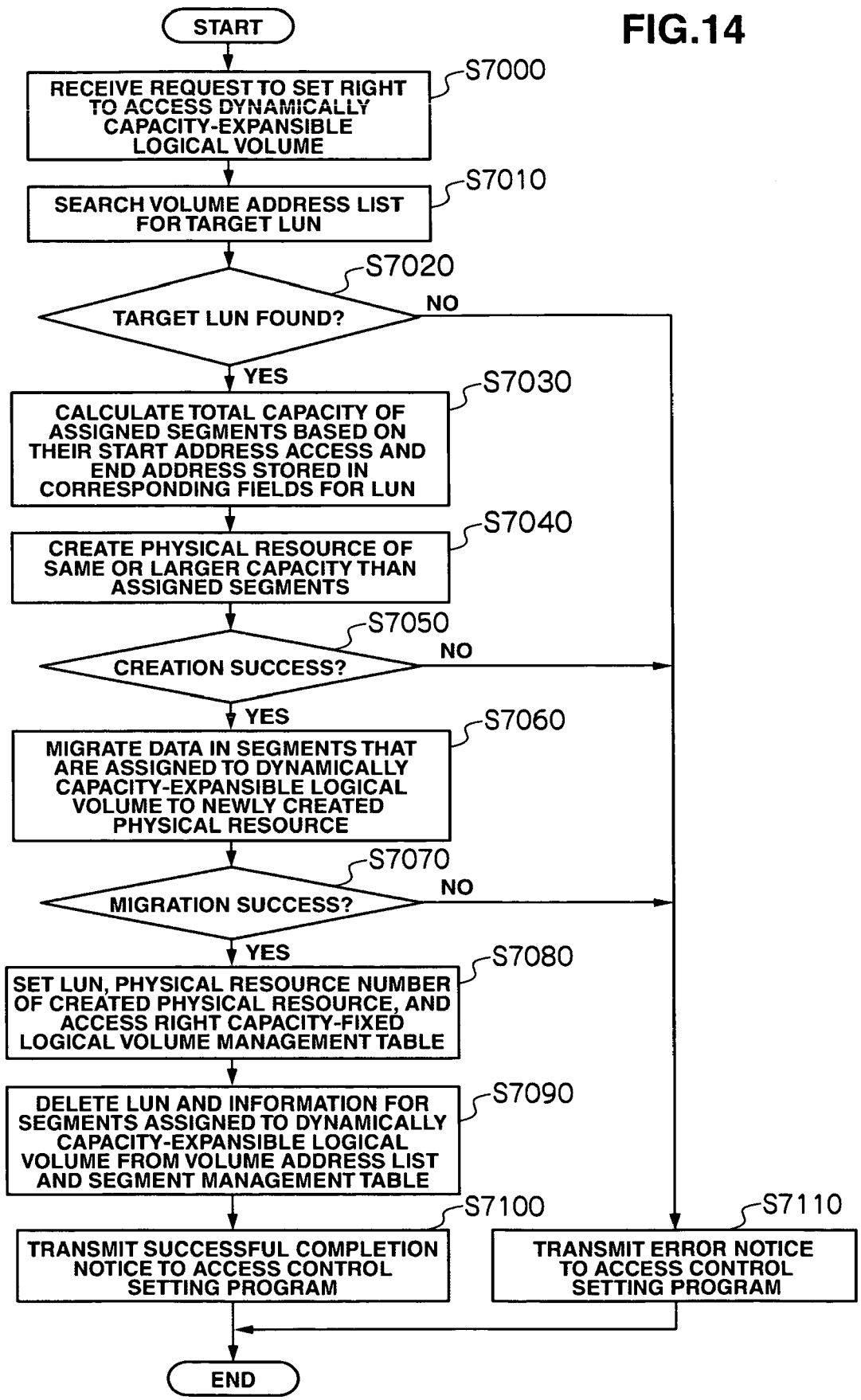
FIG. 14 shows processing executed by the dynamically capacity-expansible logical volume access control program 1212 according to Embodiment 2.

FIG. 14 is a flowchart showing the content of processing performed by the controller 1220 when it transmits an access right setting request to the dynamically capacity-expansible logical volume access control program 6050 in Step 1030 in the aforementioned access control setting processing. In this processing, the controller 1220 sets a designated access right for a designated dynamically capacity-expansible logical volume in accordance with the routine shown in the flowchart, based on the dynamically capacity-expansible logical volume access control program 6050 stored in the main memory 1210.

When the controller 1220 receives an access right setting request for the dynamically capacity-expansible logical volume access control program 6050 from the access control setting program 5100 in the management computer 5000 (S7000), it first searches the volume address list 6040 stored in the main memory 6030 for an LUN that matches the LUN contained in the access right setting request (S7010).

The controller 1220 then judges whether a matching LUN has been found in the search (S7020) and if the judgment is negative (S7020: No), it transmits an error notice to the access control setting program 5110 in the management computer 5000 (S7110) and terminates the processing for the access right setting request.

Whereas, if a matching LUN was found in the search (S7020: Yes), the controller 1220 obtains, from the volume address list 6040, start addresses and end addresses stored in the boxes corresponding to the matching LUN in the start address field T220 and its end address field T230 and calculates the total capacity of the segments assigned to the dynamically capacity-expansible logical volume (S7030). An example of a method for calculating the total capacity of the segments assigned to the dynamically capacity-expansible logical volume is first to obtain the capacity of each segment by calculating the difference between its start address and its end address, and then sum up the capacities of all the segments.

Subsequently, the controller 1220 creates a physical resource having the same or larger capacity than that of the calculated total capacity of the segments assigned to the dynamically capacity-expansible logical volume (S7040). Note that the controller 1220 does not have to create a new physical resource, but alternatively may select a physical resource 1121 that is not assigned to a logical volume 1110.

The controller 1220 then judges whether a physical resource 1121 has been created or not (S7050). If the judgment is negative (S7050: No), the controller 1220 transmits an error notice to the access control setting program 5110 (S7110) and terminates the processing for the access right setting request.

Meanwhile, if the judgment is positive (S7070: Yes), the controller 1220 obtains segment numbers of the segments assigned to the dynamically capacity-expansible logical volume from the corresponding boxes in the segment number field T210 in the volume address list 6040. The controller 1220 then searches the segment management table 1214 based on the segment numbers and executes data migration processing to migrate data currently stored in the areas in the physical resources 1121 specified by the physical resource numbers, start addresses, and the end addresses of the obtained segment numbers, to the new physical resource 1121 created in Step 7040 (S7060). In other words, if a target dynamically capacity-expansible logical volume consists of distributed segments, data stored in the segments are consolidated in one physical resource 1121. Note that data migration refers to a series of steps whereby data stored in a specified area is copied to another area and, after successful completion of the copy, the copy source area is initialized or released.

Subsequently, the controller 1220 judges whether the data migration was successful (S7070) and if the judgment is negative (S7070: No), it transmits an error notice to the access control setting program 5110 in the management computer 5000 (S7110) and terminates the processing for the access right setting request.

If the judgment is positive (S7070: Yes), the controller 1220 sets a corresponding LUN, a physical resource number for the created physical resource 1121 and an access right in the capacity-fixed logical volume management table 6060 (FIG. 6) (S7080). The access right set at this point in time is the access right contained in the access right setting request received in Step 7000.

The controller 1220 then deletes the LUN and the information for the segments assigned to the dynamically capacity-expansible logical volume from the volume address list 6040 and the segment management table 1214 (S7090), transmits a successful completion notice to the access control setting program 5110 (S7100), and terminates the processing for the access right setting request.

In Embodiment 2, data in a dynamically capacity-expansible logical volume is consolidated in one physical resource 1121 and access settings are made for the physical resource while regarding it as a capacity-fixed logical volume. The access right management method according to Embodiment 2 is particularly effective when the settings for a dynamically capacity-expansible logical volume are changed from read/write settings to read-only settings. This is because since a read-only access right is set for the dynamically capacity-expansible logical volume, the capacity of the logical volume is no longer dynamically expandable. In other words, the dynamically capacity-expansible logical volume can be handled as a capacity-fixed logical volume.

Therefore, according to the access right setting method in Embodiment 2, in addition to the effects obtained from Embodiment 1, the computer system becomes more convenient to use because it can save a user the trouble of changing the settings for a logical volume from the settings as a dynamically capacity-expansible logical volume to the settings as a capacity-fixed logical volume.

(3) Other Embodiments

Embodiments 1 and 2 are explained regarding the case where the controller 5200 controlling the entire operations of the management computer 5000 is employed as an access right setting request unit that transmits a request to set a right to access a designated logical volume for the storage system 1000 or 6010 as instructed by a predetermined external input. However, the present invention is not limited to this case and the access right setting request unit may alternatively be provided separately from the controller controlling the operation of the entire management computer 5000.

Moreover, in Embodiments 1 and 2, the same controller 1220 is configured to serve as: a control unit that dynamically expands, as necessary, the capacity of a dynamically capacity-expansible logical volume by dynamically assigning storage areas in units of segments of a predetermined size to the dynamically capacity-expansible logical volume in response to an access request from a host computer 2000; and an access right setting unit that sets a designated access right for each segment in the dynamically capacity-expansible logical volume in response to a request to set an access right for the logical volume from the management computer 5000. The present invention however is not limited to that case and so the control unit and the access right setting unit may alternatively be provided in separate structures.

Furthermore, in Embodiments 1 and 2, the first management information indicating the types of the logical volume set in the storage system 1000 or 6010—dynamically capacity-expansible logical volumes or capacity-fixed logical volumes—is configured in the form of the logical volume management table 5120 as shown in FIG. 2. However, the present invention is not limited to the case and the first management information may alternatively be in various other forms.

Also, in Embodiments 1 and 2, the second management information for managing the respective dynamically capacity-expansible logical volumes is configured in the form of the volume address list 1211 or 6040 shown in FIG. 3 or FIG. 13 and the segment management table 1214 shown in FIG. 4, and the third management information for managing the respective capacity-fixed logical volumes is configured in the form of the capacity-fixed logical volume management table 1215 or 6060 as shown in FIG. 6. However, the present invention is not limited to that case and so the second and the third management information may alternatively be configured in various other forms.

Furthermore, in Embodiment 2, the same controller 1220 in the storage system 6010 is configured to serve as: an access control unit that accepts a request to access a logical volume from a host computer 2000 only when it judges, based on the access right set for the logical volume 1110, that the host computer 2000 has the right to make the designated access specified in the access request; and a data migration unit that, in response to a request to set an access right for a dynamically capacity-expansible logical volume from the management computer 5000, obtains the overall size of the segments assigned to the logical volume, reserves a new storage area of at least an equivalent size, migrates data stored in the segments to the new storage area, and sets the new storage area as a capacity-fixed logical volume. The present invention however is not limited to that case and so the access control unit and the data migration unit may alternatively be provided in separate structures.

What is claimed is:

1. A data processing system comprising:
    a storage system including a plurality of physical resources providing logical volumes storing data from a host computer and;
    a management computer for managing the storage system, wherein,
    the logical volumes include capacity-fixed logical volumes and capacity-expansible logical volumes;
    each of the capacity-fixed logical volumes is associated one-to-one with one of first physical resource included in the plurality of physical resources;
    each of the capacity-expansible logical volumes is associated with a segment of one of second physical resources included in the plurality of physical resources and can be additionally associated with another segment of the one second physical resource or a segment of another second physical resource;

the management computer includes an access right setting request unit for transmitting, to the storage system, a request to set a right to access a designated logical volume in response to an external input;

the storage system includes a capacity-fixed logical volume access right setting unit and a capacity-expansible logical volume access right setting unit;

when the designated logical volume is one capacity-fixed logical volume of the capacity-fixed logical volumes, the capacity-fixed logical volume access right setting unit sets an access right designated by the external input for the first physical resource associated with the one capacity-fixed logical volume, and stores the information about the setting in memory; and when the designated logical volume is one capacity-expansible logical volume of the capacity-expansible logical volumes, the capacity-expansible logical volume access right setting unit sets an access right designated by the external input for each of the segments of relevant second physical resource(s) that are associated with the one capacity-expansible logical volume, and stores the information about the setting in the memory.

2. The data processing system according to claim 1, wherein the management computer comprises first memory for storing first management information for the logical volumes, the information indicating a type of each logical volume set in the storage system, with a first type being the capacity-expansible logical volumes, and a second type being the capacity-fixed logical volumes;

wherein the access right setting request unit in the management computer decides as a decision result, in response to the external input, the type of a designated logical volume based on the first management information stored in the first memory and transmits to the storage system a request to set an access right befitting the decision result;

wherein the storage system comprises second memory for storing second management information for managing all first type logical volumes and third management information for managing all second type logical volumes; and wherein the capacity-fixed logical volume access right setting unit or the capacity-expansible logical volume access right setting unit in the storage system sets, based on the access right setting request, a designated access right for a designated logical volume in the corresponding second management information or the third management information stored in the second memory, respectively.

3. The data processing system according to claim 2 wherein the second management information is a table where correspondence relationships are established between identification information given to the first type logical volumes, identification information given to the storage areas in segment units assigned to the logical volumes, addresses of the storage areas in segment units, and access rights set for the storage areas in segment units.

4. The data processing system according to claim 2 wherein the third management information is a table where correspondence relationships are established between identification information given to the second type logical volumes and the access rights set for the second type logical volumes.

5. The data processing system according to claim 1 wherein the storage system comprises an access control unit for judging, when receiving from the host computer a request to access a logical volume, whether the host computer has the right to make the access designated in the access request for the logical volume based on the access right set for the logical volume, and if the host computer has the right, accepting the access request.

6. The data processing system according to claim 1 wherein the storage system comprises a data migration unit for performing data migration processing in which, in response to a request to set a right to access a first type logical volume from the host computer, the overall size of the storage areas assigned to the logical volume is obtained, a new storage area of at least the same size is separately reserved, data stored in the logical volume is migrated to the new storage area, and then the new storage area is set as a capacity-fixed second type logical volume.

7. The data processing system according to claim 6 wherein the data migration unit obtains the overall size of the storage areas assigned to the logical volume by calculating capacities of the respective segments assigned to the target logical volume based on their start addresses and end addresses and summing up the calculated capacities of the segments.

8. The data processing system according to claim 6, wherein the data migration unit executes the data migration processing when, in the situation where a first type logical volume is currently set with an access right that permits data reading and writing, a request to set a right to access the logical volume from the host computer is a request to set an access right that permits only data reading; and wherein the storage system comprises an access right setting unit for setting the access right for the second type logical volume, to which the data has been migrated during the data migration processing, as an access right that permits only reading of the data from the logical volume.

9. A storage system comprising a plurality of physical resources providing logical volumes that store data from a host computer, wherein, the logical volumes include capacity-fixed logical volumes and capacity-expansible logical volumes;

each of the capacity-fixed logical volumes is associated one-to-one with one of a first physical resource included in the plurality of physical resources;

each of the capacity-expansible logical volumes is associated with a segment of one of second physical resources included in the plurality of physical resources and can be additionally associated with another segment of the one second physical resource or a segment of another second physical resource;

the storage system is adapted to receive, from an external access right setting request unit, a request to set a right to access a designated logical volume;

the storage system includes a capacity-fixed logical volume access right setting unit and a capacity-expansible logical volume access right setting unit;

when the designated logical volume is one capacity-fixed logical volume of the capacity-fixed logical volumes, the capacity-fixed logical volume access right setting unit sets an access right designated by the request for the first physical resource associated with the one capacity-fixed logical volume, and stores the information about the setting in memory; and when the designated logical volume is one capacity-expansible logical volume of the capacity-expansible logical volumes, the capacity-expansible logical volume access right setting unit sets an access right designated by the request for each of the segments of relevant second physical resource(s) that are associated with the one capacity-expansible logical volume, and stores the information about the setting in the memory.

10. The storage system according to claim 9, further comprising memory storing first management information for managing all the capacity-expansible logical volumes as first type logical volumes and second management information for managing all the capacity-fixed logical volumes as second type logical volumes, wherein the access right setting unit sets, based on an access right setting request, a designated access right for a designated logical volume in the corresponding first management information or the second management information stored in the memory.

11. The storage system according to claim 10 wherein the first management information is a table where correspondence relationships are established between identification information given to the first type logical volumes, identification information given to the storage areas in segment units assigned to the logical volumes, addresses of the storage areas in segment units, and access rights set for the storage areas in segment units.

12. The storage system according to claim 10 wherein the second management information is a table where correspondence relationships are established between identification information given to the second type logical volumes and the access rights set for the second type logical volumes.

13. The storage system according to claim 9, further comprising an access control unit for judging, when receiving from the host computer a request to access a logical volume, whether the host computer has the right to make the access designated in the access request to the logical volume based on the access right set for the logical volume, and if the host computer has the right, accepting the access request.

14. The storage system according to claim 9, further comprising a data migration unit for performing data migration processing in which, in response to a request to set a right to access the capacity-expansible logical volume as a first type logical volume from the host computer, the overall size of the storage areas assigned to the logical volume is obtained, a new storage area of at least the same size is separately reserved, data stored in the logical volume is migrated to the new storage area, and then the new storage area is set as a capacity-fixed second type logical volume.

15. The storage system according to claim 14, wherein the data migration unit obtains the overall size of the storage areas assigned to the logical volume by calculating the capacities of the respective segments assigned to the target logical volume based on their start addresses and end addresses and summing up the calculated capacities of the segments.

16. The storage system according to claim 14, wherein the data migration unit executes the data migration processing when, in the situation where a first type logical volume is currently set with an access right that permits data reading and writing, a request to set a right to access the logical volume from the host computer is a request to set an access that permits only data reading; and the storage system further comprising an access right setting unit for setting the access right for a second type logical volume, to which the data has been migrated during the data migration processing, as an access right that permits only reading of the data from the logical volume.

17. A computer-readable storage embodying a program to be carried out by a storage system including a plurality of physical resources providing logical volumes that store data from a host computer, the program controlling the storage system to effect:

the logical volumes to include capacity-fixed logical volumes and capacity-expansible logical volumes;

associating each of the capacity-fixed logical volumes one-to-one with one of a first physical resource included in the plurality of physical resources;

associating each of the capacity-expansible logical volumes with a segment of one of second physical resources included in the plurality of physical resources, and with, for any expanded logical volume, another segment of the one second physical resource or a segment of another second physical resource;

receiving, from an external access right setting request unit, a request to set a right to access a designated logical volume;

effecting a capacity-fixed logical volume access right setting unit and a capacity-expansible logical volume access right setting unit;

when the designated logical volume is one capacity-fixed logical volume of the capacity-fixed logical volumes, the capacity-fixed logical volume access right setting unit sets an access right designated by the request for the first physical resource associated with the one capacity-fixed logical volume, and stores the information about the setting in memory; and when the designated logical volume is one capacity-expansible logical volume of the capacity-expansible logical volumes, the capacity-expansible logical volume access right setting unit sets an access right designated by the request for each of the segments of relevant second physical resource(s) that are associated with the one capacity-expansible logical volume, and stores the information about the setting in the memory.

* * * * *